United States Patent [19]

Herr

[11] 3,842,720

[45] Oct. 22, 1974

[54] JET PUMP FOR AIRCRAFT CABIN PRESSURIZATION SYSTEM

[75] Inventor: Lewis Herr, Mill Hall, Pa.

[73] Assignee: Piper Aircraft Corporation, Lock Haven, Pa.

[22] Filed: Mar. 29, 1973

[21] Appl. No.: 346,218

[52] U.S. Cl. .................................................. 98/1.5
[51] Int. Cl. ............................................ B64d 13/04
[58] Field of Search........................... 98/1.5; 244/59

[56] References Cited

UNITED STATES PATENTS

| | | | |
|---|---|---|---|
| 2,734,356 | 2/1956 | Kleinhaus | 98/1.5 |
| 3,367,256 | 2/1968 | Townsend | 98/1.5 |

*Primary Examiner*—Meyer Perlin
*Attorney, Agent, or Firm*—Patrick J. Walsh

[57] ABSTRACT

The jet pump includes a primary nozzle in communication with the compressor section of the aircraft's turbine engine whereby primary air is bled from the engine for delivery through the primary nozzle. A secondary nozzle surrounds the primary nozzle and lies in communication with ambient air. Primary and secondary air issuing through the primary and secondary nozzles flows into a mixing tube and then through a divergent section for delivery to the aircraft cabin. The jet pump functions, and without the aid of ancillary control devices, to provide an acceptable predetermined air flow rate for pressurizing the aircraft cabin throughout the full altitude range of the aircraft.

9 Claims, 4 Drawing Figures

JET PUMP FOR AIRCRAFT CABIN PRESSURIZATION SYSTEM

This invention relates to a jet pump for use in an aircraft pressurization system and particularly relates to a jet pump for maintaining the desired air flow rate for cabin pressurization throughout the full altitude range of the aircraft without the necessity of ancillary pressure regulating mechanisms.

Various systems for pressurizing aircraft cabins have been proposed and/or constructed in the past. Certain of these systems utilize a jet pump in conjunction with ancillary pressure control devices to provide the desired air flow rate. Jet pumps are particularly useful devices for controlling bleed air from the engine for cabin pressurization and are especially useful for this purpose in aircraft utilizing turbine-type engines. In such pressurization systems, air at high pressure is bled from the compressor section of the turbine engine and mixed by the jet pump with a quantity of ambient or secondary air for delivery to the aircraft cabin at an acceptable pressure.

The jet pump performs this function by using the energy of the high pressure high temperature bleed or primary air to form a high speed jet of air which issues from a primary nozzle. This high speed jet entrains a quantity of ambient or secondary air mixing with it in the mixing tube of the jet pump to provide at the jet pump outlet an air flow of lower velocity and a pressure suitable for cabin pressurization. The jet pump thus functions to lower the quantity of bleed or primary air required from the engine compressor for pressurizing the cabin and thereby lessens the power drained from the engine for powering the cabin pressurization system. This, of course, leaves a larger proportion of engine power available for the primary purpose of the engine, i.e., to fly the aircraft.

Conventional jet pumps are usually matched to a specific set of inlet and outlet conditions. However, in an aircraft, the jet pump inlet and outlet conditions change over a wide range in response to changes in aircraft altitude. For example, in conventional jet pumps, the secondary flow rate decreases rapidly as the aircraft gains altitude. This results from decreases in the pressure and flow rate of the primary air, a decrease in available secondary or ambient air pressure, and an increase in the jet pump outlet to secondary pressure ratio. However, it is desirable at high altitudes that maximum engine power be available for flying the aircraft. Thus, with respect to any jet pump utilized in the cabin pressurization system, it is desirable to minimize the amount of bleed air from the compressor thereby to minimize the engine power loss at such high altitude. Further, the greatest inside-outside pressure differential exists at the maximum aircraft altitude requiring maximum cabin pressurization. This, in turn, imposes the greatest load on the jet pump making it desirable to obtain maximum jet pump efficiency at the maximum aircraft altitude in order to maximize the secondary air flow. Maximum jet pump efficiency, however, requires substantial bleed or primary air with consequent undesirable lessening of the power available for flying the aircraft at such maximum altitude. Conversely, at low altitude, maximum engine power need not be available and a greater proportion of the power generated may be made available for operation of other aircraft systems. Also, a smaller inside-outside pressure differential exists and this, in turn, imposes a relatively smaller load on the jet pump. Thus at the altitude at which maximum engine power is readily available for powering the ancillary pressurization system, there is a lesser requirement for utilizing such power to operate the pressurization system. In short, the characteristics of conventional jet pumps used in aircraft pressurization systems have not matched throughout the full altitude range of the aircraft the foregoing and other various and countervailing parameters and requirements of an optimum aircraft pressurization system. Accordingly jet pumps currently utilized in cabin pressurization systems require control devices external to the jet pump to provide an acceptable air flow rate in the aircraft cabin throughout the full altitude range of the aircraft. For example, pressure regulators external to the jet pumps have been utilized to control the primary pressure whereby an acceptable air flow rate is provided throughout the aircraft's altitude range. External devices to control the primary mass flow rate and the secondary flow rate to a predetermined schedule, i.e., in accordance with the altitude of the aircraft have also been utilized in conjunction with jet pumps to provide the acceptable air flow rate through the aircraft's altitude range.

With the foregoing considerations in mind, the present invention provides a novel and improved jet pump for use in aircraft cabin pressurization systems which eliminates the requirement for external control devices in prior aircraft pressurization systems utilizing jet pumps and thereby provides various advantages in construction, mode of operation and result over such prior aircraft pressurization systems. Principally the present invention provides a novel and improved jet pump which controls the air flow rate within a desired and acceptable design envelope throughout the altitude range of the aircraft without the use of any external control devices. Particularly, the present invention provides a jet pump which controls the engine bleed and secondary flow rates automatically as a function of altitude and without any control devices external to the jet pump to maintain the acceptable air flow rate for cabin pressurization throughout the aircraft's altitude range. With the present jet pump, primary or bleed air is minimized and secondary or ambient air is maximized at the maximum altitude, i.e., maximum pumping of secondary air at the maximum aircraft altitude is obtained. Further, an optimum ratio of primary or secondary air is maintained to provide an acceptable air flow rate for cabin pressurization throughout the aircraft altitude range. Consequently, at the maximum altitude, there is minimum power loss and maximum power is available for flight. For example, with the jet pump hereof, the percentage of secondary air flow rate to the total air flow rate decreases with decreasing altitude while simultaneously the secondary air flow rate increases absolutely with decreasing altitude to maintain the required mix necessary to promote an acceptable air flow rate at each discrete altitude.

While the precise manner in which the jet pump hereof operates to per se provide an acceptable air flow rate for cabin pressurization purposes throughout the aircraft's altitude range and without the aid of ancillary control devices is not completely understood, it is believed that such acceptable air flow rate is maintained by forming the mixing tube diameter of the jet pump to a diameter sufficiently small such that the secondary air flow becomes progressively restricted as the aircraft altitude decreases from its maximum. Since the pressure and energy of the primary air increases with engine power as the altitude decreases, the quantity of primary air increases with an increase in primary nozzle pressure. It is believed that the increase in primary air and its pressure in conjunction with the selected diameter of the mixing tube, progressively chokes the mixing tube in response to decreasing altitude such that a smaller and smaller percentage of secondary air to total air is pumped, albeit simultaneously, an absolutely increasing proportion of secondary to total air flow is provided.

Accordingly, it is the primary object of the present invention to provide a novel and improved jet pump for aircraft cabin pressurization systems wherein control devices external to the jet pump and heretofore necessary to provide the desired air flow rate throughout the full range of aircraft altitude are completely eliminated.

It is another object of the present invention to provide a jet pump for use in an aircraft cabin pressurization system wherein the engine bleed rate as well as the percent engine power loss due to operation of the pressurization system decreases with increasing altitude.

It is still another object of the present invention to provide a novel and improved jet pump adapted for aircraft cabin pressurization systems wherein the percentage of ambient or secondary air flow to total air flow for the cabin pressurization system increases with increasing altitude.

It is a related object of the present invention to provide in an aircraft cabin pressurization system a novel and improved jet pump which obtains optimum primary and secondary air flow rates at each altitude condition of the aircraft to produce a total air flow rate acceptable to pressurize the aircraft cabin at each such altitude.

These and further object and advantages of the present invention will become more apparent upon reference to the following specification, claims, and appended drawings wherein:

Figure 1:
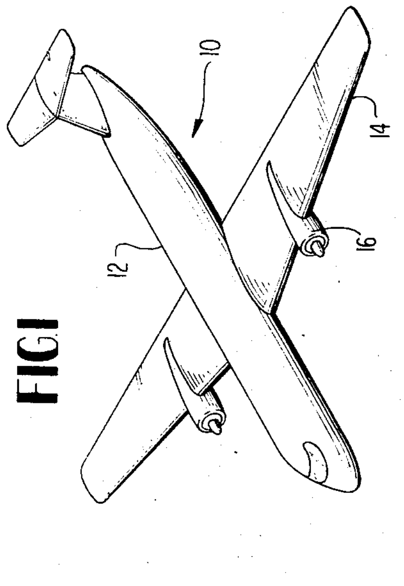
FIG. 1 is a schematic illustration of an airplane employing an aircraft pressurization system constructed in accordance with the present invention.
Figure 2:
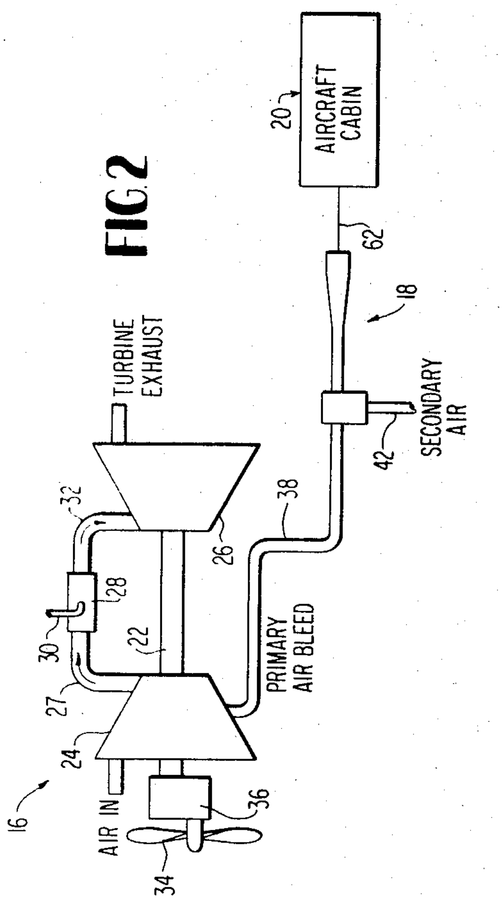
FIG. 2 is a schematic view illustrating an aircraft pressurization system hereof in conjunction with a turbo-prop engine.

Referring now to FIG. 1, there is illustrated an aircraft generally designated 10 having a fuselage 12 and a pair of wings 14 each mounting an engine, in this instance, a turbo-prop engine 16. While the aircraft pressurization system hereof is particularly useful with a turbo-prop type engine, it will be appreciated that the system can also be employed in aircraft utilizing any type of turbine engine wherein compressors supply high pressure, high temperature air. Referring to FIG. 2, there is illustrated the turbo-prop engine generally designated 16, and a jet pump generally designated 18 constructed in accordance with the present invention. The jet pump 18 is illustrated receiving bleed air from the turbo-prop engine and delivering the required air flow rate for pressurizing the aircraft cabin schematically illustrated 20.

The turbo-prop engine 16 includes a shaft 22 mounting a compressor section 24 and a turbine section 26, the latter driving compressor section 24. As will be appreciated, air flows into the compressor 24 and is discharged under high pressure into a duct 27 leading to combustions chambers 28. Fuel is provided the combustion chambers through nozzles 30 and the hot gases from the combustion chambers flow through a duct 32 for discharge against the blades of the turbine section 26. The exhaust gases emitted from the turbine section augment the thrust provided by the propeller 34. Propeller 34 is drivingly coupled to the shaft 22 through a reduction gear 36. It will be appreciated that the turbo-prop engine described above is conventional and per se forms no part of the present invention, its description and incorporation in the present application being provided for a more clear understanding of the present invention.

The aircraft pressurization system hereof bleeds air, herein sometimes referred to as primary air, from the compressor section 24 of the engine 16 via conduit 38 which in turn communicates with the primary nozzle 47 of the jet pump 18. Ambient air, herein sometimes referred to as secondary air, is provided jet pump 18 via a conduit 42. It will be appreciated that jet pump 18 may be mounted directly on the engine nacelle with the primary air flowing from the compressor section of the engine being routed through a heat exchanger The secondary air inlet may be located on the engine cowling for deliverying ambient air directly to pump 18.

Figure 3:
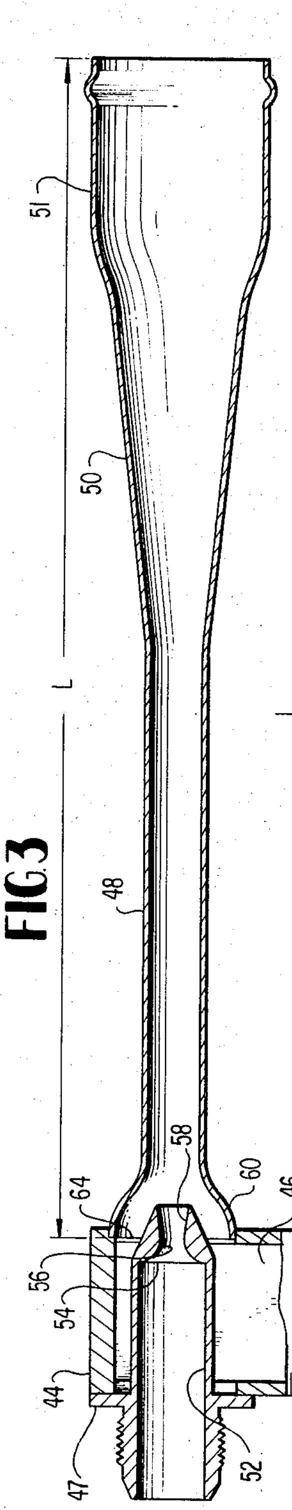
FIG. 3 is an enlarged vertical cross-sectional view of a jet pump constructed in accordance with the present invention.

Referring now particularly to FIG. 3, there is illustrated a jet pump having a body 44 defining a chamber 46. An end of secondary air inlet conduit 42 is secured to body 44 whereby secondary air is provided chamber 46. A primary nozzle assembly 47 is secured to body 44 in communication with conduit 38. Primary or bleed air thus flows through conduit 38 and nozzle assembly 47 into a mixing tube 48 which, in turn, lies in communication at its remote end with a divergent section 50 and a straight or end section 51. The nozzle assembly 47 includes an inlet section 52, a nozzle entrance portion or cone 54, a nozzle throat 56, and a nozzle outlet or divergent section 58. Mixing section 48 is outwardly flared at one end at 60 and is secured to body 44 in axial alignment with the nozzle assembly 47. The divergent section 58 of nozzle assembly 47 extends within the outwardly flared portion 60 of the mixing section. It will be appreciated that the secondary air flows through conduit 42 into chamber 46 about the primary nozzle inlet 52 and outwardly from body 44 into the mixing section 48 and divergent section 50 through an annular secondary nozzle 64 surrounding the primary nozzle assembly 47. Thus the primary and secondary flow through the jet pump are mixed within section 48 and flow through the divergent section 50 to provide air at an intermediate pressure to aircraft cabin 20 via a conduit 62 (FIG. 2).

In a specific and preferred embodiment of the present invention, the length of the straight portion of the mixing section is 5 inches. The lengths of the divergent and end sections 50 and 51 are 4.50 and 1.38 inches respectively. The total length of the diverging, mixing and end sections at L is 11.66 inches. The mixing tube 48 has a diameter of 0.438 inch while the flared end 60 and end section 51 have maximum diameters of 1.16 and 1.65 inches respectively. The diameter of the inlet section 52 is .609 inch while the diameter of the throat 56 is 0.250 inch. The nozzle outlet diameter at OD is 0.274 inch. The nozzle outlet is also axially spaced 0.53 inch upstream from the upstream end of the mixing tube throat. The total axial extent of the nozzle inlet section 54 to the nozzle outlet is 0.502 inch. The secondary nozzle 64 has cross-sectional areas at its throat and outlet of 0.15 to 1.06 in.$^2$. It will be appreciated that the length to diameter ratio of the mixing section is 5/.438 or 11.4, and preferably this ratio lies within a range of 8 to 14. The ratio of the cross-sectional area of the mixing section to the cross-sectional area of the primary nozzle throat is 0.15/0.049 or 3.04. Preferably this ratio should be maintained within a range of 2 to 4.

The conical angle of the divergent section is 11° and should be maintained with a range of 9° to 13°. Also, the ratio of the primary nozzle exit to throat area is 0.059/0.49 or 1.2 and should be sized to prevent overexpansion of the primary jet at the lowest aircraft altitude at which maximum cabin differential can be achieved. In this invention the primary nozzle exit to throat area is sized to prevent overexpansion at 12,500 altitude.

Figure 4:
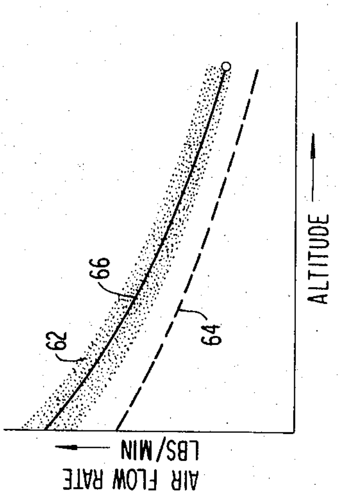
FIG. 4 is a graph illustrating the desired design envelope as a function of air flow rate and altitude and particularly illustrating the primary, secondary and total flow rate as a function of altitude in the pressurization system hereof.

Referring now to FIG. 4, there is illustrated an air flow envelope 62 plotted as a function of air flow rate (pounds per minute) against aircraft altitude. It is desirable that the air flow rate for cabin pressurization purposes be maintained within the illustrated envelope at any desired altitude up to the maximum altitude of the aircraft. For example, it is necessary that the air flow rates provide the generally accepted cabin pressurization of about 5.50 p.s.i.g. throughout the full altitude range of the aircraft.

In the jet pump constructed in accordance with the present invention, the proportion of the primary air flow rate to the total air flow rate to the cabin is indicated by the distance between dashed line 64 and the abscissa in FIG. 4 as a function of altitude. The proportion of secondary air flow rate to the total air flow rate is given in FIG. 4 as the distance between the dashed line 64 and the total flow rate curve indicated 66. The sum of the primary and secondary flow rates thus gives a total flow rate curve 66 which lies wholly within the desired air flow envelope throughout a full altitude range of the aircraft. It will be noted from a review of FIG. 4 that the percentage of the primary air flow rate to total air flow rate provided at the maximum altitude is less than the percentage of primary air to total air flow rates provided at sea level or at any altitude therebetween and that such percentage increases with decreasing altitude. Consequently, it will be appreciated that a minimum air flow rate is bled from the engine at the maximum altitude leaving maximum power available to the engine at the maximum altitude. It will also be appreciated that the quantity of secondary flow increases with decreasing altitude although the ratio of secondary to primary air decreases with decreasing altitude.

The foregoing specifically described jet pump has a capability of providing 0–1 PSIG cabin pressure at sea level with the primary air being delivered to the pump at about 90 PSIA and the secondary air being delivered to the pump at about 15 PSIA. At about 30,000 feet, the same pump can provide a cabin pressure of about 6 PSIG with the primary air being delivered to the pump at about 20 PSIA and the secondary air being delivered to the pump at about 4.4 PSIA. It will be appreciated that the foregoing is achieved without utilizing any pressure control devices external to the jet pump.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pressurization system for an aircraft comprising the combination of an engine including a source of air under pressure, a jet pump for pressurizing the cabin in the aircraft, said jet pump including a primary nozzle in communication with the air under pressure from the engine, a secondary nozzle in communication with ambient air, a tube in communication with said nozzles on the downstream side thereof for receiving and mixing the air issuing from said nozzles, a divergent section at the opposite end of said mixing tube for receiving the mixed air from said nozzles and communicating it to the aircraft cabin, said mixing tube having a length to width ratio within a range of about 8 to 14, said jet pump being effective per se to provide an acceptable air flow rate for pressurizing the cabin throughout the full altitude range of the aircraft.

2. Apparatus according to claim 1 wherein the ratio of the cross-sectional area of said second nozzle at its throat to the cross-sectional area of said first nozzle at its throat is within a range of about 2 to 4.

3. Apparatus according to claim 1 wherein the ratio of the cross-sectional area of the mixing tube to the cross-sectional area of said first nozzle at its throat is within a range of about 2 to 4.

4. Apparatus according to claim 1 wherein, the ratio of the cross-sectional areas of said first and second nozzles at their throats being within a range of about 2 to 4, the ratio of the cross-sectional area of the mixing tube to the cross-sectional areas of said first and second nozzles at their throats lying within the ranges of 2 to 4.

5. Apparatus according to claim 1 wherein said mixing tube has a length to width ratio of about 11.4.

6. Apparatus according to claim 1 wherein the ratio of the cross-sectional area of said first nozzle at its throat to the cross-sectional area of said second nozzle at its throat is about 3.04.

7. Apparatus according to claim 1 wherein the ratio of the cross-sectional area of the mixing tube to the cross-sectional area of said first nozzle at its throat is about 3.04.

8. Apparatus according to claim 1 wherein the ratio of the cross-sectional area of the mixing tube to the cross-sectional area of said second nozzle at its throat is about 1.00.

9. Apparatus according to claim 1 wherein the ratio of the area of the outlet of said first nozzle to the area of the first nozzle at its throat is about 1.20.

* * * * *